April 4, 1950 M. E. BUTLER 2,503,095

TELEPHONE ACCESSORY

Filed April 15, 1947 2 Sheets-Sheet 1

Inventor
Marshall E. Butler

By Clarence A. O'Brien
and Harvey B. Jacobson
Attorneys

Inventor

Marshall E. Butler

By Clarence A. O'Brien and Harvey B. Jacobson

Attorneys

Patented Apr. 4, 1950 2,503,095

UNITED STATES PATENT OFFICE 2,503,095

TELEPHONE ACCESSORY

Marshall E. Butler, Raleigh, N. C.

Application April 15, 1947, Serial No. 741,479

1 Claim. (Cl. 179—2)

Figures 1, 4:
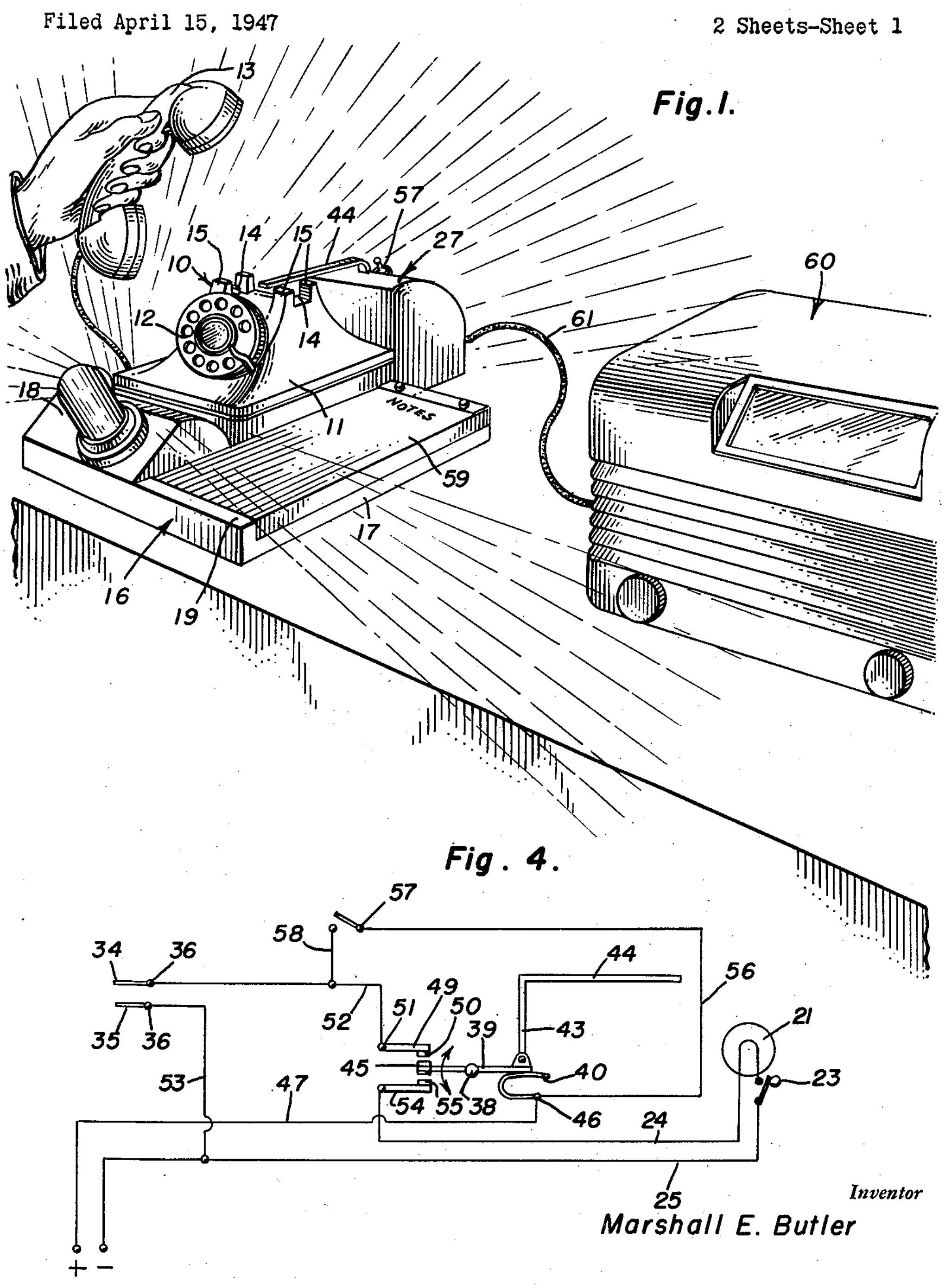

This invention relates to a telephone accessory and has for its primary object automatically to disconnect a radio or like instrument when the receiver is lifted from a telephone.

Another object is to enable the user of the telephone to restore the power to a radio or like instrument at will and without replacing the receiver on the telephone.

A further object is automatically to illuminate the dial of a dial telephone when the receiver is lifted from the hook thereof.

The above and other objects may be attained by employing this invention which embodies among its features a base upon which the base of a telephone hand set is adapted to rest, illuminating means on one side of the base adapted to illuminate the dial of the telephone, a control switch at the edge of the base remote from the illuminating means adapted to control the flow of power to a radio in the vicinity of the telephone and means actuated by the lifting of the telephone receiver off of the telephone base to actuate the switch and interrupt the flow of power to the radio.

Other features include means actuated automatically by the lifting of the telephone receiver from the telephone to illuminate the dial thereof and means under manual control of the user of the telephone to restore the flow of power to a radio to which the power has been interrupted by the lifting of the receiver of the telephone.

Figure 3:
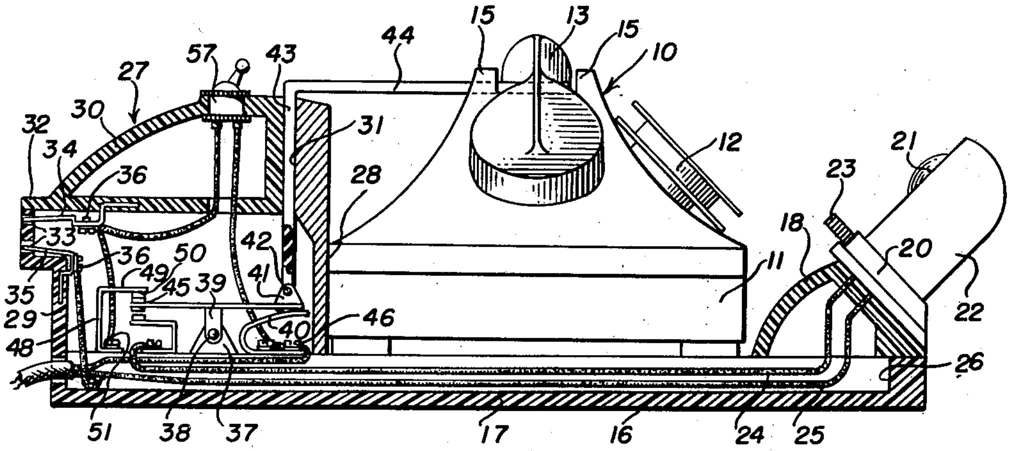
Figure 2:
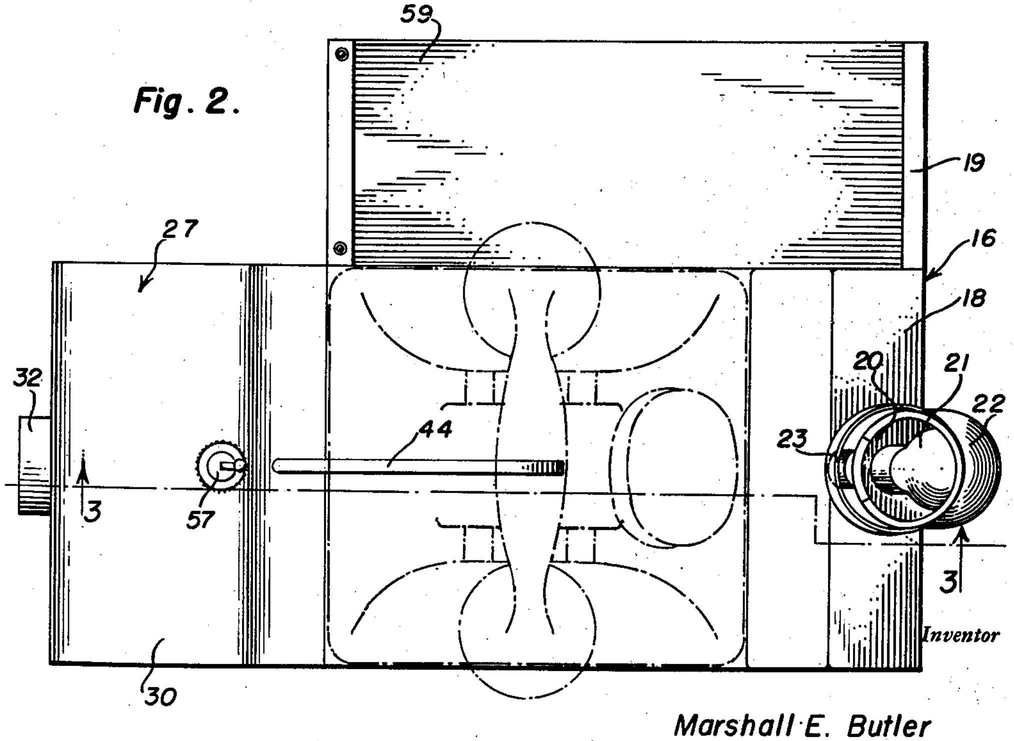

In the drawings,

Figure 1 is a perspective view of a telephone attachment embodying the features of this invention showing a telephone in place thereon, and the attachment coupled with the power feed cable of a radio, Figure 2 is a top plan view of the accessory with a telephone indicated thereon in broken lines, Figure 3 is a longitudinal sectional view taken substantially along the line 3—3 of Figure 2, and Figure 4 is a wiring diagram illustrating the switching mechanism of the accessory.

Referring to the drawings in detail, a telephone designated generally 10 of the conventional style of a hand set is equipped with a base 11, a dial 12, a receiver 13, and the conventional buttons 14 (Fig. 1) which are normally engaged by the receiver when the latter is in place on the base to control the telephone circuits. The structure so far recited is of conventional form and the buttons 14 are located in the conventional manner between upstanding guide ears 15 which cooperate with the top of the base 11 in forming a cradle in which the receiver 13 rests.

My improved attachment designated generally 16 comprises a base 17 formed along one edge with a pedestal 18 and an adjoining flange 19. The pedestal 18 is equipped with a conventional lamp socket 20 for a miniature lamp 21, and partially enshrouding the lamp 21 is a hood 22 having an open side which is directed toward the dial 12 of the telephone 10 when the latter is in position on the base. A conventional switch is mounted in the lamp base in order locally to control the flow of power to the lamp 21 and this switch is equipped with a thumbpiece 23 of conventional form. Leading from the lamp base 20 are conductors 24 and 25 which are preferably imbedded in a groove 26 formed in the base 17 which extends across the base and opens into a housing to be more fully hereinafter described. Carried along the side edge of the base 17 remote from the pedestal 18 is a housing designated generally 27 which comprises front and back walls 28 and 29 joined by end walls and enclosed within a cover 30. As illustrated, a vertical passage 31 extends through the cover 27 to the interior of the housing near the front wall 28 and projecting from the rear wall 29 is a hollow extension 32 which is pierced with spaced slots 33 of the type commonly employed in plug receptacles. Imbedded in a portion of the cover 30 is a spring tongue 34, the free end of which is disposed in the uppermost opening 33, and a similar spring tongue 35 is imbedded in the end wall 29 with its free end disposed in the lower opening 33 to form contact termini for a conventional attachment plug. Each of these spring tongues 34 and 35 is equipped with a binding screw 36 for a purpose to be more fully hereinafter explained.

Mounted in spaced brackets 37 of insulating material which extend upwardly within the housing 27 from the base 17 is a pivot shaft 38 upon which is pivotally mounted a rocker arm 39. A leaf spring 40 is fixed to the base 17 with one end bearing against the underside of the rocker arm 39 adjacent the end toward the wall 28, and this end of the rocker arm is equipped with a bracket 41 in which is pivotally mounted as at 42 the lower end of a push rod 43. This push rod extends upwardly through the opening 31 and is provided with a horizontally extending arm 44 which projects toward the lamp bulb 21 and is adapted to be engaged by the receiver 13 of the telephone when the latter is in place in the cradle formed by the ears 15. It will thus be seen that with the receiver 13 in place on the telephone 10 the arm 44, push rod 43 and the end of the rocker arm 39 coupled thereto will be depressed against the pressure of the spring 40. The end of the rocker arm opposite that engaged by the spring 40 is equipped with a contact point 45 the purpose of which will be more fully hereinafter explained. A suitable binding screw 46 enters the spring 40 adjacent the end remote from that engaging the rocker arm 39 and this binding screw is coupled through the medium of a conductor 47 to one terminal of a suitable source of power supply (not shown). Secured to the base 17 within the housing 27 and extending upwardly therefrom is a contact support 48 carrying at its upper end a horizontal arm 49 to the underside of which is connected a contact 50 which is located directly above the contact 45 on the arm 39, so that when the arm 39 is moved by the downward movement of the plunger 43, the contacts 45 and 50 will be moved into engagement with one another. A binding screw 51 is carried by the arm 48 and is connected through the medium of a conductor 52 with the binding screw 36 of the spring tongue 34. The binding screw 36 of the spring tongue 35 is coupled through the medium of a conductor 53 with the conductor 25 which leads to the side of the power source opposite that to which the conductor 47 is connected. As illustrated, the terminal of the conductor 24 opposite that coupled with the lamp 21 leads to a conducting arm 54 carrying a contact 55 which is positioned directly beneath the end of the rocker arm 39 opposite that engaged by the spring 40.

In order to restore the flow of power to the instrument which may have been cut off by the lifting of the receiver from the telephone, I couple to the binding screw 46 a conductor 56 which leads through a suitable switch 57 mounted in the top of the cover 27. The opposite terminal of the switch 57 is coupled through the medium of the conductor 58 with the conductor 52 and it will thus be seen that even though the flow of current from the power source to the spring tongue 34 may be interrupted by the lifting of the receiver 13 from the telephone, the flow of current may be restored by the user of the telephone simply by closing the switch 57.

A suitable pad 59 of writing paper may be supported on the base 17 adjacent the flange 19 so as to be within convenient reach of the user of the telephone while he is carrying on a conversation.

In use, a radio or like instrument designated generally 60 is coupled through a conventional cord 61 equipped with an attachment plug of conventional form to the telephone accessory by entering the prongs of the plug into the openings 33 and into contact with the spring tongues 34 and 35. In this condition, when the telephone receiver 13 is in place on the telephone 10, the plunger rod 43 will be depressed so as to move the rocker arm 39 against the effort of the spring 40 and bring the contacts 45 and 50 into engagement with one another. Current may then flow from one terminal of the power source through the conductor 47, spring 40, rocker arm 39, contacts 45 and 50 and the conductor 52 to the spring tongue 34, returning through the spring tongue 35 and conductor 53 to the conductor 25 from whence it returns to the source of power. Thus, a radio or like instrument plugged into the receptacle may be operated in the normal manner. As soon as the telephone receiver is lifted from the telephone the spring 40 will move the rocker arm 39 about its pivot 38, thus breaking the contact between the contacts 45 and 50 and establishing contact between the contact on the underside of the rocker arm with the contact 55 so that with the switch in the lamp circuit closed, the lamp 21 automatically will be lighted. Obviously, by opening the switch in the lamp circuit, the illumination may be under direct local control of the user of the telephone. Likewise, by closing the switch 57 the flow of current to the radio or like instrument may be restored even though the telephone receiver is off of the telephone and in use. Since the switch 57 is carried directly by the accessory it is obvious that it, too, may be locally controlled by the user of the telephone.

While in the foregoing there has been shown and described the preferred embodiment of this invention it is to be understood that minor changes in the details of construction, combination and arrangement of parts may be resorted to without departing from the spirit and scope of the invention as claimed.

I claim:

A telephone accessory for a telephone hand set having a dial, said accessory comprising a stand upon which the base of a telephone hand set rests, illuminating means mounted on the base adjacent one side thereof for illuminating the dial of the telephone hand set, a rocker arm mounted in the stand adjacent the side thereof remote from the illuminating means to rock in a vertical arc, an elongated push rod mounted in the stand to move vertically therein, the lower end of said push rod being connected to the rocker arm adjacent one end thereof, a horizontal arm on the push rod adjacent the upper end thereof, said horizontal arm overlying the top of the telephone hand set in the path of movement of the receiver of the hand set during its removal from and replacement on the base, spring means within the stand and engaging the rocker arm to yieldingly urge the push rod upwardly, a contact member within the stand beneath the rocker arm and in the path of movement thereof, said contact being electrically coupled to the illuminating means to establish a flow of electrical energy therethrough when the rocker arm and push rod move upwardly under the influence of the spring, a second contact within the stand above the rocker arm and in the path of movement thereof, an electric outlet within said stand, said outlet having a pair of spaced plug blade-engaging contacts and means electrically coupling one of said last-named contacts with the second-mentioned contact.

MARSHALL E. BUTLER.

REFERENCES CITED

The following references are of record in the file of this patent:

UNITED STATES PATENTS

| Number | Name | Date |
|---|---|---|
| 1,113,537 | Boze | Oct. 13, 1914 |
| 1,893,325 | Foster et al. | Jan. 3, 1933 |
| 1,960,214 | Deron | May 22, 1934 |
| 1,966,184 | O'Neil | July 10, 1934 |
| 1,982,457 | Schmitt | Nov. 27, 1934 |
| 2,212,791 | Reading | Aug. 27, 1940 |